(12) United States Patent
Haverkamp

(10) Patent No.: US 12,248,065 B2
(45) Date of Patent: Mar. 11, 2025

(54) OPTICAL DEVICE FOR DETERMINING A DISTANCE OF A MEASUREMENT OBJECT

(71) Applicant: Carl Zeiss Industrielle Messtechnik GmbH, Oberkochen (DE)

(72) Inventor: Nils Haverkamp, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 1038 days.

(21) Appl. No.: 17/196,984

(22) Filed: Mar. 9, 2021

(65) Prior Publication Data
US 2021/0278533 A1 Sep. 9, 2021

(30) Foreign Application Priority Data
Mar. 9, 2020 (DE) ...................... 10 2020 202 982.2

(51) Int. Cl.
*G01S 17/08* (2006.01)
*G01S 7/484* (2006.01)
(Continued)

(52) U.S. Cl.
CPC .............. *G01S 17/08* (2013.01); *G01S 7/484* (2013.01); *G01S 7/486* (2013.01); *G01S 7/4911* (2013.01)

(58) Field of Classification Search
CPC .......... G01S 17/08; G01S 7/484; G01S 7/486; G01S 7/4911; G01S 7/4815; G01S 17/34; G01S 17/66; G01S 7/497
See application file for complete search history.

(56) References Cited

U.S. PATENT DOCUMENTS 8,363,226 B2 * 1/2013 Kuramoto .......... G01B 9/02067
356/487
8,913,636 B2 12/2014 Roos et al.
(Continued)

FOREIGN PATENT DOCUMENTS

DE 102012001754 A1 8/2013
DE 102018222629 A1 7/2019

OTHER PUBLICATIONS

Benham Behroozpur Baghmisheh, Chip-scale Lidar, Technical Report No. UCB/EECS.2017-4.
(Continued)

*Primary Examiner* — Isam A Alsomiri
*Assistant Examiner* — Joseph C Fritchman
(74) *Attorney, Agent, or Firm* — Ewers IP Law PLLC; Falk Ewers

(57) ABSTRACT

An optical device for determining a distance of a measurement object includes a LIDAR unit and a light sensor. The LIDAR unit has an illumination device to illuminate the measurement object and a measurement channel to detect a measurement beam reflected from the measurement object and to generate a LIDAR measurement signal. The light sensor has an optical source with a mode-locked laser to generate first and second frequency comb signals and splits the first frequency comb signal into a first measurement signal and a first reference signal and to illuminate the measurement object with the first measurement signal. The light sensor splits the second frequency comb signal into a second measurement signal and a second reference signal. An evaluation unit determines first distance information, evaluates signals detected by a measurement detector and a reference detector, generates a frequency spectrum, and determines second distance information of the measurement object.

10 Claims, 2 Drawing Sheets

(51) Int. Cl.
    *G01S 7/486*    (2020.01)
    *G01S 7/4911*   (2020.01)

(56) References Cited

U.S. PATENT DOCUMENTS

| | | |
|---|---|---|
| 9,559,486 B2 | 1/2017 | Roos et al. |
| 9,976,843 B2 | 5/2018 | Koos et al. |
| 2011/0007326 A1 | 1/2011 | Daxauer et al. |
| 2011/0043815 A1 | 2/2011 | Giaccari et al. |
| 2011/0285980 A1 | 11/2011 | Newbury et al. |
| 2013/0050410 A1 | 2/2013 | Steinbichler et al. |
| 2015/0070685 A1* | 3/2015 | Koos ............ G01P 3/36 356/486 |
| 2016/0123718 A1 | 5/2016 | Roos et al. |
| 2017/0123052 A1* | 5/2017 | Hinderling ........ G01C 15/002 |
| 2017/0258531 A1 | 9/2017 | Bodjanski |
| 2017/0299697 A1 | 10/2017 | Swanson |
| 2019/0219698 A1 | 7/2019 | Hoegele et al. |
| 2021/0381819 A1* | 12/2021 | Jang ............... H01S 3/06754 |

OTHER PUBLICATIONS

Trocha et al, Ultrafast optical ranging using microresonator soliton frequency combs, Science, Research Reports, Feb. 23, 2018, vol. 359 Issue 6378.
Office Action issued in German Patent Application No. DE 10 2020 202 982.2, dated Nov. 10, 2020 (from which this application claims priority), and English language translation thereof.

\* cited by examiner

OPTICAL DEVICE FOR DETERMINING A DISTANCE OF A MEASUREMENT OBJECT

CROSS REFERENCE TO RELATED APPLICATIONS

This application claims priority to German patent application DE 10 2020 202 982.2, filed Mar. 9, 2020, the entire content of which is incorporated herein by reference.

TECHNICAL FIELD

The disclosure relates to an optical device for determining a distance of a measurement object and to a method for determining a distance of a measurement object. The present disclosure relates, in particular, to the field of coordinate measuring technology. The optical device and the method can be used in particular for industrial applications and outdoor applications, such as building digitization on construction sites.

BACKGROUND

Known optical systems based on interferometry function only on a limited surface spectrum and generally yield only incremental displacement statements, i.e., no absolute distance measurements. Furthermore, a permanent line-of-sight link is required. This precludes interrupted measurements, so-called intermittent use, such as is often required in industrial metrology for geometry or process reasons.

Furthermore, in known coordinate measuring systems or machines, generally scales, in terms of their mechanical dimensioning, have to correspond to a length to be measured, which is representable only piecewise particularly for long lengths, and as mechanical material measures have to be protected against all adverse circumstances of everyday work. Measurement speeds can be rather low.

Optical systems are known which are based on the light detection and ranging (LIDAR) measurement principle, also called laser detection and ranging (LADAR). However, such devices cannot simultaneously ensure very high accuracies and very high tracking bandwidths or measurement rates, which, particularly for measurements to be performed while in motion, are simultaneous requirements that are not negotiable in relation to one another.

A further approach involves distance measurements using mode-locked lasers, as described for example in "Ultrafast optical ranging using microresonator soliton frequency combs", P. Trocha et al., Science, RESEARCH REPORTS, 23 Feb. 2018, Vol. 359 Issue 6378. These allow very high tracking bandwidths to be achieved in conjunction with very high accuracies but have a limited unambiguity range.

SUMMARY

It is therefore an object of the present disclosure to provide an optical device and a method for determining a distance of a measurement object which at least largely avoid the disadvantages of known devices and methods. In particular, the intention is to enable a compact and robust distance measurement.

This object is achieved with an optical device for determining a distance of a measurement object and a method for determining a distance of a measurement object as described herein.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B", "A has B", "A comprises B" or "A includes B" can refer both to the situation in which no further element aside from B is provided in A (that is to say to a situation in which A consists exclusively of B) and to the situation in which, in addition to B, one or more further elements are provided in A, for example element C, elements C and D, or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the disclosure, as will be recognized by the person skilled in the art, can also be carried out using other configurations. In a similar way, features introduced by "in one embodiment of the disclosure" or by "in one exemplary embodiment of the disclosure" are understood as optional features, without the intention being thereby to restrict alternative configurations or the scope of protection of the independent claims. Furthermore, all possibilities of combining the features introduced by these introductory expressions with other features, whether optional or non-optional features, are intended to remain unaffected by said introductory expressions.

In a first aspect of the present disclosure, an optical device for determining a distance of a measurement object is provided.

Within the scope of the present disclosure, an "optical device" can be understood to mean any device having at least one optical sensor system, in particular at least one optical sensor. As will be explained in detail further below, the optical device can have a hybrid optical sensor system, also referred to as hybrid sensor system. Within the scope of the present disclosure, a "hybrid optical sensor system" can be understood to mean an optical sensor system having measurement systems based on various optical measurement methods.

Within the scope of the present disclosure, a "distance measurement" can be understood to mean a determination of a longitudinal coordinate of the measurement object in particular measuring and/or detecting and/or recording the longitudinal coordinate. The distance can be a distance between a reflective point of a surface or a reflective surface segment of the measurement object and the optical device. By way of example, the distance can be information about a distance between a location on the surface of the measurement object and the optical device. The location can be any location, in particular a point or an area, on the surface to be measured of the measurement object, at which a coordinate is captured. By way of example, a location can be a measurement point on the surface of the measurement object. The longitudinal coordinate can be a height coordinate. The optical device can determine further coordinates of the measurement object. The coordinates can be selected from the group consisting of: at least one transverse coordinate of the measurement object, for example an x- and/or y-coordinate, and a longitudinal coordinate. One or more coordinate systems can be used to determine the distance. By way of example, a Cartesian coordinate system or a spherical coordinate system can be used. Other coordinate systems are also conceivable. The optical device can have an optical axis. The optical axis can be an axis of a coordinate system, for example the z-axis. A height coordinate, distance coordinate, or a distance can be understood to mean a coordinate along the z-axis. Further axes, for example x-axis and y-axis, and also axes of rotation, can be provided perpendicular to the z-axis.

The optical device can furthermore be configured to determine a spatial position and orientation of the measurement object. A spatial position can be understood to mean a three-dimensional point (X, Y, and Z) in the coordinate system, in particular a position of the object. An orientation can be understood to mean an alignment of the measurement object, in particular an angular position in the measurement volume. The orientation can be specified by at least three angles, for example an Euler angle or inclination angle, a roll angle and a yaw angle.

A "measurement object" within the scope of the present disclosure can be understood to mean an object to be measured that has any shape. By way of example, the measurement object can be a test specimen, a workpiece, a component to be measured, a measuring head of a sensor or a tool that can be used to probe a component. The measurement object can be at least one retroreflector and/or can have at least one retroreflector. By way of example, the optical device can be configured to determine three spatial degrees of freedom of the measurement object having a retroreflector. By way of example, the measurement object can have three retroreflectors and/or be connected thereto. In this regard, a 6D determination of three spatial and three angular degrees of freedom of a measurement object connected to the retroreflectors may be possible. A retroreflector can be understood to mean a device that reflects an incident light beam. By way of example, the retroreflector can be a marker. By way of example, the retroreflector can be selected from the group consisting of: a cat's eye, spherical lenses with a reflection layer, a marker as described in US 2011/0007326 A1, US 2013/0050410 A1, or US 2017/0258531 A1, the content of which is hereby incorporated, a cube prism, a corner cube. The retroreflector can be arranged on the measurement object fixedly and/or interchangeably. A position of the retroreflector on the measurement object can be known. The measurement object can have a plurality of retroreflectors, for example two, three, four, five, six, or more retroreflectors. An arrangement having two retroreflectors can be used for example for exemplary embodiments in which degrees of freedom of the measurement object that is intended to be localized by way of the retroreflectors are blocked.

The optical device comprises:
a) at least one LIDAR unit, having at least one illumination device configured to generate at least one frequency-modulated input light beam and to illuminate the measurement object with the input light beam, wherein the LIDAR unit has at least one measurement channel configured to detect at least one measurement beam reflected from the measurement object in response to the input light beam and to generate at least one LIDAR measurement signal;
b) at least one light sensor having at least one optical source with at least one mode-locked laser, wherein the mode-locked laser is configured to generate at least one first frequency comb signal and at least one second frequency comb signal, wherein the light sensor is configured to split the at least one first frequency comb signal into at least one first measurement signal and at least one first reference signal and to illuminate the measurement object with the first measurement signal, wherein the light sensor is configured to split the second frequency comb signal into at least one second measurement signal and at least one second reference signal, wherein the light sensor has at least one measurement detector and at least one reference detector, wherein the measurement detector is configured to detect the first measurement signal reflected from the measurement object and the at least one second measurement signal, wherein the reference detector is configured to detect the first reference signal and the second reference signal;
c) at least one evaluation unit configured to determine at least one item of first distance information of the measurement object from the LIDAR measurement signal, wherein the evaluation unit is configured to evaluate the signals respectively detected by the measurement detector and the reference detector and to generate at least one frequency spectrum of the respective signals, wherein the evaluation unit is configured to determine at least one item of second distance information of the measurement object from a comparison of the frequency spectrum detected by the measurement detector and the frequency spectrum detected by the reference detector.

A "LIDAR unit" can be understood to mean a device that is based on the LIDAR ("light detection and ranging") measurement principle, which is also referred to as LADAR (laser detection and ranging). As described above, the LIDAR unit has at least one illumination device configured to generate at least one frequency modulated input light beam, a so-called "frequency modulated continuous wave" (FMCW). The LIDAR unit can be configured to generate the input light beam, the frequency of which is tuned continuously, according to the FMCW method. By way of example, the frequency of the input light beam can be linearly modulated with time. In principle, a combination of LIDAR method and FMCW method is known to a person skilled in the art, for example from Chipscale Lidar, Benham Behroozpur Baghmisheh, Technical Report No. UCB/EECS.2017-4. By way of example, the LIDAR unit can be configured as described in U.S. Pat. No. 9,559,486 B2, U.S. Pat. No. 8,913,636 B2 or US 2016/123718 A1.

An "illumination device" can be understood to mean a device configured to generate a light beam. In the context of the present disclosure, "light" can be understood to mean electromagnetic radiation in at least one spectral range selected from the visible spectral range, the ultraviolet spectral range and the infrared spectral range. The term visible spectral range encompasses, in principle, a range of 380 nm to 780 nm. The term infrared (IR) spectral range encompasses, in principle, a range of 780 nm to 1000 μm, wherein the range of 780 nm to 1.4 μm is designated as near infrared (NIR) and the range of 15 μm to 1000 μm is designated as far infrared (FIR). The term ultraviolet encompasses, in principle, a spectral range of 100 nm to 380 nm. IR light, that is to say light from the infrared spectral range, is typically used in the context of the present disclosure. The input light beam of the LIDAR unit can have light of at least one wavelength of 1000 nm to 1700 nm. The term "light beam" can be understood to mean, in principle, a quantity of light which is emitted and/or radiated in a specific direction. The illumination device can have at least one light source.

A "frequency-modulated input light beam" can be understood to mean a light beam which is generated by the illumination device and has a modulated, for example linearly modulated, frequency. The illumination device can have at least one FMCW light source. The illumination device can have at least one adjustable (tunable) laser source, for example at least one distributed feedback (DFB) laser diode or a Distributed Bragg Reflector (DBR) laser diode.

"Illuminating the measurement object" can be understood to mean impinging on the measurement object with the input light beam. By way of example, for illuminating the measurement object, the input light beam can be coupled into the measurement channel, in particular into at least one optical fiber and be guided to the measurement object. Even further optical elements, such as lenses and mirrors, can additionally be used for illuminating the measurement object.

A "measurement channel" can be understood to mean an element of the LIDAR unit, which is configured to illuminate the measurement object, in particular at least one retroreflector, with at least one portion of the input light beam and to capture at least one beam reflected from the measurement object.

The measurement channel can have at least one optical fiber, in particular at least one monomode fiber and/or at least one multimode fiber.

The measurement channel can have at least one first optical element. The first optical element can be configured to couple the input light beam passing through the optical fiber out of the optical fiber and to couple the light beam reflected from the measurement object into the optical fiber. The optical fiber can have a fiber beginning and a fiber end, wherein at least one portion of the input light beam passes through the optical fiber from fiber beginning to fiber end. The first optical element can be arranged at the fiber end. The optical element can include an output coupling optical unit. The optical element can include an input coupling optical unit. The output coupling optical unit and the input coupling optical unit can be identical.

The measurement channel can have at least one static or adjustable mirror. By way of example, the optical device can have at least one controller configured to control the mirror and to set it into any angular position.

The measurement channel can have at least one optical unit configured to expand a light beam into a solid angle, such that the measurement object, in particular at least three retroreflectors arranged on the measurement object, are irradiated. By way of example, the measurement channel can have a wide-angle lens. The optical unit can have at least one converging lens or a concave lens. Typically, use can be made of a converging lens, which facilitates an approximately tilted plane wavefront at the retroreflector and good efficiency during the input coupling at the focal point.

The measurement channel is configured to capture at least one measurement beam reflected from the measurement object in response to the input light beam. A "reflected measurement beam" can be understood to mean a light beam reflected from the measurement object in response to the input light beam. The reflected measurement beam can be an output light beam of the measurement channel. The LIDAR unit can have at least one sensor element configured to detect the reflected measurement beam. "Detecting the reflected measurement beam" can be understood to mean detecting the output light beam of the measurement channel. In the context of the present disclosure, a "sensor element" can be understood to mean any device that is configured to receive and/or record the reflected measurement beam. The sensor element can have at least one photodiode.

The LIDAR unit is configured to generate at least one LIDAR measurement signal. The LIDAR unit can be configured to generate a reference light beam. The LIDAR unit can include at least one reference arm. The reference light beam can be a current input light beam which is supplied to the sensor element via the reference arm of the LIDAR unit, for example. The sensor element can be configured to superpose the reflected measurement beam on the reference light beam. A "LIDAR measurement signal" can be understood to be a signal of the LIDAR unit, which has at least one item of information about a frequency difference, also referred to as frequency delta, between the reference light beam and reflected measurement beam. The LIDAR measurement signal can be a signal in which the reference light beam is superposed on the reflected measurement beam. The LIDAR measurement signal can be a frequency spectrum of a beat signal of the reference light beam superposed with the reflected measurement beam. The LIDAR unit can be configured to superpose the reference light beam on at least one reflected measurement beam and to determine a frequency spectrum of an arising beat signal.

The optical device has at least one evaluation unit. In this case, an "evaluation unit" can be understood generally to mean an electronic device configured to evaluate signals generated by the LIDAR unit and/or the light sensor. By way of example, one or more electronic connections between the LIDAR unit and the evaluation unit and/or the light sensor and the evaluation unit can be provided for this purpose. The evaluation unit can include for example at least one data processing device, for example at least one computer or microcontroller. The data processing device can have one or more volatile and/or non-volatile data memories, wherein the data processing device can be configured for example in terms of programming to control the LIDAR unit and/or the light sensor. The evaluation unit can furthermore include at least one interface, for example an electronic interface and/or a human-machine interface such as, for example, an input/output device such as a display and/or a keyboard. The evaluation unit can be constructed for example centrally or else in a decentralized manner. Other configurations are also conceivable. The evaluation unit can have at least one A/D converter.

The evaluation unit is configured to determine at least one item of first distance information of the measurement object from the LIDAR measurement signal. Within the scope of the present disclosure, an item of "distance information" can be understood to mean an item of information about the distance of the measurement object, for example a distance value and/or the longitudinal coordinate and/or a change in the distance. The identification as "first" and "second" distance information should be regarded purely as designations here.

The LIDAR unit can be configured to superpose a reference light beam on at least the captured reflected measurement beam and to determine a frequency spectrum of an arising beat signal. The evaluation unit can be configured to determine the frequency spectrum with a Fourier transformation. The frequency spectrum can have at least one maximum, in particular a plurality of maxima, so called peaks. The evaluation unit can be configured to identify at least one peak of the frequency spectrum. The LIDAR unit can be configured to determine at least one peak in the frequency spectrum. The first distance information of the measurement object can be determined from the information about the arrangement of the peak in the frequency spectrum.

The evaluation unit can be configured to carry out a calibration method. The evaluation unit can be configured to calibrate a fit function. At least one frequency spectrum can be determined in the calibration method for at least one retroreflector with a known distance. The evaluation unit can be configured to determine at least one peak in the frequency spectrum and to calibrate that with the known distance. In this case, said fit function can be a 1D polynomial, for example, wherein the z-coordinate of the retroreflector is mapped onto the frequency position in the frequency spectrum. The evaluation unit can be configured to calculate the distance of the retroreflector from the information about the peak position in the frequency spectrum.

By way of example, the measurement object can have at least three retroreflectors. In the case of a use of at least three retroreflectors, the spatial position, that is to say the 3D information, of the measurement object can be determined. In particular, the spatial position can be determined as described in DE 10 2018 222 629 A1, the content of which is hereby incorporated. The LIDAR unit can be configured to determine at least three peaks in the frequency spectrum for each retroreflector and to determine the spatial position of the measurement object therefrom. In the calibration method, the evaluation unit can determine at least three peaks in the frequency spectrum and calibrate these with a known spatial position of the retroreflector. In this case, the fit function can be a 3D polynomial, for example, wherein the three (x, y, and z) coordinates of the known spatial position of the retroreflector are mapped onto the frequency position. The evaluation unit can be configured to calculate the three (x, y, and z) coordinates of the retroreflector with known 3D points with numerically inverting said fit function.

The LIDAR unit can have a plurality of measurement channels. In particular, the LIDAR unit can be configured as described in DE 10 2018 222 629 A1, the content of which is hereby incorporated. The measurement channels can be configured identically or differently. The measurement channels can be configured at least partly separated from one another in space and/or time. "At least partly separated in space" can be understood to mean that spatially non-separated portions of the measurement channels are possible, wherein at least one portion of the respective measurement channels is separated from the other measurement channels in space. Here, "at least partly separated in time" can be understood to mean that the measurement channels are operated at different times, with a time overlap being possible. Typically, the optical fibers can have different lengths. This can facilitate a separation of the respective measurement channels in a frequency spectrum. The optical fibers can each have a length offset, for example. A length offset can be understood to mean a delay path of arbitrary length. The length offset of the optical fibers can be such that respective frequency spectra of the measurement channels are identifiable and/or separable in the frequency spectrum described below.

The LIDAR unit can be configured to operate the measurement channels in parallel and/or sequentially. In the case of parallel operation, a measurement of a plurality of distances at the same time can be facilitated. The LIDAR unit can have at least one first beam splitter, in particular a multiplexer. A beam splitter can be understood to mean a device configured to supply the input light beam to at least one measurement channel and/or to split, at least in part, the input light beam among the measurement channels in parallel and/or sequentially. The first beam splitter can be configured to supply the entire input light beam to a first measurement channel and to successively supply it to a second and a third measurement channel. As an alternative or in addition thereto, the beam splitter can be configured to split the input light beam into at least two portions. The first beam splitter can be configured to split the input light beam among the measurement channels in parallel and/or sequentially. The first beam splitter can be arranged upstream of the respective optical fiber of the measurement channel in the propagation direction of the input light beam.

Further, the measurement channels can each have at least one second beam splitter. The second beam splitter can be arranged downstream of the respective optical fiber of the measurement channel in the propagation direction of the input light beam. The second beam splitter can be configured to provide the input light beam in parallel and/or sequentially for the purpose of illuminating at least one of the retroreflectors. "Providing the input light beam" can be understood to mean an impingement with the input light beam.

In particular, the spatial position and spatial orientation can be determined with a configuration of the LIDAR unit having a plurality of measurement channels as described in DE 10 2018 222 629 A1, the content of which is hereby incorporated. With a configuration of the LIDAR unit having a plurality of measurement channels, the evaluation unit can be configured for example to identify at least nine peaks during a parallel measurement in three measurement channels. The evaluation unit can be configured to assign the peaks to a measurement channel in each case. By way of example, in the case of a parallel measurement with three measurement channels, the evaluation unit can be configured to assign the nine identified peaks in 3×3 groups, which are also referred to as measurement channel groups. A spatial position of the three retroreflectors can be determined from the items of information about the exact distribution and/or arrangement of the peaks in the individual groups. A 3D point can be determined from three lengths in different directions. Complete 6D information can be determined in the case of a known arrangement of the retroreflectors on the measurement object.

By way of example, the evaluation unit can be configured to fit the frequency spectrum with an empirically or semi-empirically determined and/or determinable function under the assumption of a known position of the retroreflectors on the measurement object and thus to determine the 6D information. A last known position of the retroreflectors can be used as initial value. As a result of at least three retroreflectors and at least three measurement channels, at least 9 peaks can arise in the frequency spectrum of the LIDAR signal, which, with the simple separation into three measurement channel groups, lead to at least $3^3=27$ expedient 3-peak-tuples and, as a result thereof, 27 possible 3D positions, so-called candidates, can be found. Here, the correct or actual three 3D positions can be selected by calculating the distances, e.g., the Euclidean distances, between all 3-subsets of the 27 candidates and the last found value, the so-called start value. Here, this 3-subset with the smallest summed distances from the start value may constitute a suggestion for the correct 3 3D points which have the 6D information. In particular, the geometric arrangement of the markers on the measurement object can also be taken into account as validity criterion in this selection, as can, also, the predictions for the 3D points that arise from the temporal change of the 6D information items at earlier times, taking account of the expected inertia of the movement of the measurement object.

As explained above, there can be a parallel measurement in the three measurement channels. This can have the effect that, during the superposition of the reflected measurement beams and the reference light beam, which is also referred to as reference signal, not only interference between the respective measurement beam and the reference signal arises, but also interference between the individual measurement beams arises. The optical device can be configured in such a way that a separation of the peaks as a result of interference as a result of superposition of the respective reflected measurement beams from the peaks as a result of interference as a result of superposition of the respective reflected measurement beams with the reference light beam is possible. By way of example, at least one parameter selected from the group consisting of: depth distances of the retroreflectors on the object; length offset of the optical fibers; length of a signal analysis time window; measurement volume depth; sampling frequency of the A/D-converter can be selected in such a way that a separation of the peaks in the frequency spectrum is possible. The evaluation unit can be configured to separate the interference as a result of superposition of the respective measurement beams from the interference as a result of superposition of the respective measurement beams with the reference light beam. The evaluation unit can have at least one band pass and/or high pass filter.

The optical device can have a hybrid optical sensor system. The optical device includes at least one light sensor in addition to the LIDAR unit. The LIDAR unit and the light sensor are measurement systems based on different optical measurement methods. A combination of these two optical measurement systems has numerous advantages and can enable, in particular, an extremely compact and robust realization for distance measurement.

A "light sensor" can be understood to mean any optical sensor and/or an optical sensor system which is configured to optically interact with the measurement object and capture a response of the measurement object to the interaction, for example a reflected light beam generated by the measurement object in response to a measurement signal.

The light sensor has at least one optical source with at least one mode-locked laser. An "optical source" can be understood to mean any illumination device which is configured to generate at least one light beam. The light source can comprise at least one frequency comb generator. A "frequency comb generator" can be understood to mean a device which is configured for at least one frequency measurement. The optical source, in particular the frequency comb generator, can comprise at least one dual frequency comb source. Within the scope of the present disclosure, a "frequency comb source" can be understood to mean a source, in particular a laser source, which is configured to generate the at least one frequency comb. The frequency comb can have a plurality of modes having a substantially constant spacing with respect to one another. By way of example, the frequency spacing of the modes can be strictly constant, with phase fluctuations being possible, in the mode-locked lasers.

The mode-locked laser is configured to generate at least one first frequency comb signal and at least one second frequency comb signal. Here, the expressions "first" and "second" provide no information about a sequence or whether further signals are provided. A "frequency comb signal" within the scope of the present disclosure can be understood to mean a light signal including a pulse train. The pulse train can have a plurality of pulse repetitions of the frequency comb. Within the scope of the present disclosure, a "dual frequency comb source" can be understood to mean a source which is configured to generate at least two frequency comb signals, in particular simultaneously. The optical source can include two integrated continuous wave (cw) laser sources.

The first and second frequency comb signals can have wavelengths of 1000 nm to 1700 nm. A typical wavelength range may emerge from the spectral width of the pulse of the employed optical source, for example a mode-locked laser. This is inversely proportional to the pulse duration. By way of example, a carrier wavelength can range from 1530 nm to 1550 nm, around which sidebands with a width inversely proportional to the pulse length then "group". Here, the sidebands can be distributed in comb shaped fashion, in particular equidistantly, in frequency space. In the case where a mode-locked laser is used, the spectrum is in principle comb shaped with a frequency spacing corresponding to the inverse laser resonator circulation time. The term "light signal" can be understood to mean, as a matter of principle, a quantity of light which is emitted and/or radiated in a specific direction.

The first frequency comb signal and the second frequency comb signal can be dissipative Kerr soliton (DKS) frequency comb signals. The dual frequency comb source can include at least two microresonators, in particular silicon nitride ($Si_3N_4$) microresonators. The continuous wave (cw) laser sources can be configured to pump the microresonators. The microresonators can be configured to generate the DKS frequency comb signals. Furthermore, the dual frequency comb source can include at least one amplifier, in particular an erbium doped fiber amplifier.

The first frequency comb signal and the second frequency comb signal can have the same wavelength range or a different wavelength range. By way of example, the first frequency comb signal and the second frequency comb signal can have frequencies ranging from 150 to 500 THz. By way of example, the first frequency comb signal and the second frequency comb signal can have laser wavelengths around 1300 nm or else around 1100 nm. The first frequency comb signal and the second frequency comb signal can have a spectral overlap, at least in part, such that a beat arises.

The light sensor is configured to split the first frequency comb signal into at least one first measurement signal and at least one first reference signal and to the illuminate the measurement object with the first measurement signal. A "first measurement signal" can be understood to mean a portion of the first frequency comb signal which interacts with the measurement object. A "first reference signal" can be understood to mean a portion of the first frequency comb signal which is undisturbed.

The light sensor is configured to split the second frequency comb signal into at least one second measurement signal and at least one second reference signal. The designations "second measurement signal" and "second reference signal" refer to two portions of the second frequency comb signal, both of which are undisturbed, in particular do not interact with the measurement object. In this case, the second measurement signal denotes the portion of the second frequency comb signal which is detected in the measurement detector. The second measurement signal can be a signal having a known spectral intensity profile. In this case, the second reference signal denotes the portion of the second frequency comb signal which is detected in the reference detector.

The light sensor has at least one measurement detector and at least one reference detector. Within the scope of the present disclosure, a "measurement detector" can be understood to mean any detector which is configured to detect an incident input light signal. Within the scope of the present disclosure, a "reference detector" can be understood to mean any detector which is configured to detect an incident input light signal. The "input light signal" can be understood to be an incident light beam. "Detecting" can be understood to mean capturing and/or recording. The measurement detector and the reference detector can have an identical configuration. By way of example, the measurement detector and the reference detector can each have at least one photodetector. Here, the designation "measurement detector" denotes the detector which is configured to detect a light beam reflected from the measurement object. Here, the designation "reference detector" denotes the detector which is configured to detect at least one reference beam.

The measurement detector and the reference detector can be configured to each generate at least one electrical signal in response to the incident light signals. The measurement detector and the reference detector can each have at least one amplifier configured to amplify the electrical signals.

The measurement detector is configured to detect the first measurement signal reflected from the measurement object and the second measurement signal. The measurement detector and the reference detector can be configured for a multi-heterodyne detection. The measurement detector can be configured to superpose the first measurement signal and the second measurement signal. This allows a signal, the second measurement signal, with a known spectral intensity profile to be superposed on a signal to be measured, the first measurement signal. The first measurement signal and the second measurement signal can have slightly different frequencies so that so-called "beats" are generated in the case of a superposition of the first measurement signal and the second measurement signal. The reference detector can be configured to superpose the first reference signal and the second reference signal. The first reference signal and the second reference signal can have slightly different frequencies so that beats are generated in the case of a superposition of the first reference signal and the second reference signal. A coordinate of the measurement object, in particular a distance therefrom, can be determined from a comparison of the beat spectra detected by the measurement detector and the reference detector.

The evaluation unit can be configured in terms of programming to control the optical source and/or the measurement detector and/or the reference detector.

The evaluation unit is configured to evaluate the signals respectively detected by the measurement detector and the reference detector and to generate at least one frequency spectrum of the respective signals. In this context, "signals" should be understood to mean the first measurement signal and the second measurement signal, and also the first reference signal and the second reference signal. The evaluation unit is configured to determine at least one item of second distance information of the measurement object from a comparison of the frequency spectrum detected by the measurement detector and the frequency spectrum detected by the reference detector.

The light sensor can be configured to determine a plurality of coordinates, in particular 3D information, of the measurement object. The light sensor is mounted so as to be movable about at least two axes. Within the scope of the present disclosure, "mounted so as to be movable" can be understood to mean that the light sensor is movable with respect to the measurement object about at least two axes. By way of example, the light sensor can include at least one bearing unit which is configured to move the light sensor and/or the light sensor can be introducible in at least one actuator of the coordinate measuring machine which is configured to move the light sensor. By way of example, the bearing unit can include a rotary swivel device and/or a rotary swivel joint. The light sensor can be mounted so as to be movable about to at least five axes, typically six axes. The light sensor can be a three-dimensional light sensor. The light sensor can be a line and/or area sensor. In addition to determining a first coordinate of the measurement object, for example a longitudinal coordinate, being mounted so as to be movable about at least two axes allows at least one further coordinate of the measurement object to be determined following a displacement of the light sensor. This can facilitate a 3D measurement of the measurement object. By changing the alignment of the light sensor along at least one further axis, it is possible to determine further coordinates of the measurement object in the manner described.

The evaluation unit can include at least one analogue-to-digital converter (ADC) configured to receive the electrical signals generated by the measurement detector and the reference detector. The evaluation unit can include at least one field programmable gate array (FPGA) configured to evaluate the signals received by the ADC.

The LIDAR unit and/or the light sensor can be implemented on at least one photonic integrated circuit (PIC). A "photonic integrated circuit" can be understood to be an optical system which is configured for communication between components of the circuit with light signals. To this end, the components of the circuit can be disposed on a common substrate, for example a chip, more particularly a microchip. The photonic integrated circuit can include a plurality of light guides, in particular fiber-based light guides. An implementation as a photonic integrated circuit can enable a compact design of the optical device.

The light sensor can have at least one photonic integrated circuit. By way of example, the light sensor can have at least one photonic multichip. The multichip can include the optical source, the measurement detector, the reference detector, the photonic integrated circuit and the signal and data processing unit. By way of example, the photonic multichip can be configured as described in "Ultrafast optical ranging using microresonator soliton frequency combs", P. Trocha et al., Science, RESEARCH REPORTS, 23 Feb. 2018, volume 359, issue 6378. The photonic integrated circuit facilitates a robust, comparatively inexpensive and compact integration of frequency comb generators in measuring and processing machines.

The photonic integrated circuit can be configured to split the first frequency comb signal into the at least one first measurement signal and the at least one first reference signal and to split the second frequency comb signal into the at least one second measurement signal and at least one second reference signal. The photonic integrated circuit can include at least one first fiber-based signal splitter configured to split the first frequency comb signal into the first measurement signal and the first reference signal. The photonic integrated circuit can include at least one second fiber-based signal splitter configured to split the second frequency comb signal into the second measurement signal and the second reference signal. The photonic integrated circuit is configured to guide the first measurement signal to the coupling device of the light sensor in order to illuminate the measurement object with the first measurement signal. The coupling device is configured to couple the first measurement signal reflected from the measurement object into the photonic integrated circuit. A "coupling device" can be understood to be a device which is configured to input and output couple a light signal from the photonic integrated circuit, in particular a light guide of the photonic integrated circuit. The coupling device can include at least one microlens. The microlens can be configured to collimate the first measurement signal to the measurement object.

The photonic integrated circuit can be configured to guide the reflected first measurement signal to the measurement detector. To this end, provision can be made of one or more light guides configured to guide the first measurement signal from the coupling device to the measurement detector. The photonic integrated circuit can be configured to guide the first reference signal to the reference detector. To this end, one or more light guides can be provided between the first fiber-based signal splitter and the reference detector.

The photonic integrated circuit can be configured to guide the second measurement signal to the measurement detector. To this end, one or more light guides can be provided between the second fiber-based signal splitter and the measurement detector. The photonic integrated circuit is configured to guide the second reference signal to the reference detector. To this end, one or more light guides can be provided between the second fiber-based signal splitter and the reference detector.

The optical device can be configured for tracking the measurement object. Within the scope of present disclosure, "tracking" the measurement object can be understood to mean determining the distance and/or a change in the distance at different points in time. In particular, the optical device can be configured to track a movement of the measurement object.

The optical device can be configured such that the first distance information and the second distance information are determined simultaneously. "Simultaneously" can be understood to mean a measurement and/or evaluation at least partly at the same time and/or at least partly in parallel. "At least partly at the same time" and "at least partly in parallel" can be understood to mean a measurement and/or evaluation completely at the same time and/or in parallel, wherein embodiments are conceivable in which steps for determining the first distance information and the second distance information are effected successively and/or at different times.

The optical device can enable a distance measurement in which a measurement of a distance and/or of a change in the distance is effected simultaneously with a LIDAR unit and a light sensor with a mode-locked laser. For the LIDAR unit it is possible to give up a high tracking bandwidth as a requirement. The absolute distance measurement can be effected only at a speed sufficient to ensure that a situation where a distance measurement with the light sensor crosses the limit of the ambiguity range is detected unambiguously and certainly. This can increase the measurement accuracy. The measurement with the LIDAR unit can yield a low frequency, highly accurate absolute distance measurement. Light sensors using a mode-locked laser can have a limited unambiguity range within which displacements can be measured unambiguously. For the light sensor it is possible to give up the requirement for a large unambiguity range, which makes it possible to increase the sampling rate. The light sensor can, using a mode-locked laser, for example a femtosecond laser, yield a high-frequency, highly accurate distance measurement within the unambiguity range of the laser. The hybrid sensor system, that is to say the combination of the LIDAR unit and the light sensor, can make it possible to improve and/or increase a performance with regard to sampling rate, measurement range, resolution and accuracy in comparison with optical systems employing single sensor technology.

The evaluation unit can be configured to determine an item of combined distance information from the first distance information and the second distance information. An item of "combined distance information" can be understood to mean an item of information about the distance which is determined taking account of the first distance information and the second distance information. The LIDAR unit can determine distances accurately to 100 micrometers at 10 Hz, for example. The distance measuring system with at least a mode-locked laser yields distances accurate to 1 micrometer modulo unambiguity range at 10 kHz, for example. Typically, the unambiguity range should be larger than the accuracy of the LIDAR unit. The first distance information is used for a coarse distance and the second distance information is used for a fine determination of the distance. The first distance information is used for a coarse distance and the second distance information is used for a fine determination of the distance. The distance information of the LIDAR unit can be used for the coarse distance and the distance information of the mode-locked laser can be used for the decimal places. By way of example, the evaluation unit can be configured to determine and compare a measurement accuracy of the first distance information and of the second distance information. The evaluation unit can be configured to select one of the first distance information and the second distance information as combined distance information, depending on the result of the comparison. The evaluation unit can be configured to select the first distance information as combined distance information outside an unambiguity range of the mode-locked laser. Determining combined distance information can make it possible to improve and/or increase a performance with regard to sampling rate, measurement range, resolution and accuracy in comparison with optical systems with single sensor technology.

In a further aspect, a method for determining a distance of a measurement object is provided within the scope of the present disclosure. At least one optical device according to the disclosure is used in the method. With regard to definitions and exemplary embodiments, reference is made to the description of the optical device according to the disclosure. The method has the following method steps:

i) determining at least one item of first distance information of the measurement object with at least one LIDAR unit, having at least one illumination device, wherein at least one frequency-modulated input light beam is generated by the illumination device and the measurement object is illuminated with the input light beam, wherein the LIDAR unit has at least one measurement channel, wherein at least one measurement beam reflected from the measurement object in response to the input light beam is detected by the measurement channel and at least one LIDAR measurement signal is generated, wherein the first distance information of the measurement object is determined from the LIDAR measurement signal by at least one evaluation unit;

ii) determining at least one item of second distance information of the measurement object with at least one light sensor having at least one optical source with at least one mode-locked laser, wherein at least one first frequency comb signal and at least one second frequency comb signal are generated by the mode-locked laser, wherein the first frequency comb signal is split into at least one first measurement signal and at least one first reference signal and the measurement object is illuminated with the first measurement signal, wherein the second frequency comb signal is split into at least one second measurement signal and at least one second reference signal, wherein the light sensor has at least one measurement detector and at least one reference detector, wherein the first measurement signal reflected from the measurement object and the second measurement signal are detected by the measurement detector, wherein the first reference signal and the second reference signal are detected by the reference detector, wherein the signals respectively detected by the measurement detector and the reference detector are evaluated by the evaluation unit and at least one frequency spectrum of the respective signals is generated, and wherein at least one item of second distance information of the measurement object is determined from a comparison of the frequency spectrum detected by the measurement detector and the frequency spectrum detected by the reference detector.

In this case, the method steps can be carried out in the order specified, wherein one or more of the steps can at least partly also be carried out simultaneously and wherein one or more of the steps can be multiply repeated. Furthermore, further steps can additionally be performed independently of whether or not they are mentioned in the present application. The method can be carried out automatically.

The method can include simultaneously determining the first distance information and the second distance information.

In the method, combined distance information can be determined from the first distance information and the second distance information. The LIDAR unit can determine distances accurately to 100 micrometers at 10 Hz, for example. The distance measuring system with at least a mode-locked laser yields distances accurate to 1 micrometer modulo unambiguity range at 10 kHz, for example. Typically, the unambiguity range should be larger than the accuracy of the LIDAR unit. The distance information of the LIDAR unit can be used for the coarse distance and the distance information of the mode-locked laser can be used for the decimal places. By way of example, a measurement accuracy of the first distance information and of the second distance information can be determined and compared. Depending on the result of the comparison, one of the first distance information and the second distance information can be selected as combined distance information. By way of example, the first distance information can be selected as combined distance information outside an unambiguity range of the mode-locked laser.

Furthermore, within the scope of the present disclosure, a computer program is provided which, when executed on a computer or computer network, carries out the method according to the disclosure in one of its configurations.

Furthermore, in the context of the present disclosure, a computer program comprising a program code is provided for carrying out the method according to and aspect of the disclosure in one of its configurations when the program is executed on a computer or computer network. In particular, the program code can be stored on a non-transitory computer-readable storage medium.

In addition, within the scope of the present disclosure, a data storage medium is provided on which a data structure is stored, said data structure, after being loaded into a random access memory and/or main memory of a computer or computer network, being able to carry out the method according to the disclosure in one of its configurations.

Moreover, within the scope of the present disclosure, a computer program product comprising a program code stored on a non-transitory computer-readable storage medium is provided for carrying out the method according to an aspect of the disclosure in one of its configurations when the program is executed on a computer or computer network.

In this case, a computer program product is understood to mean the product as a commercially available product. In principle, it can be available in any form, for example on paper or on a computer readable data medium, and, in particular, it can be distributed via a data transmission network.

Finally, within the scope of the present disclosure, a modulated data signal is provided which contains instructions that can be executed by a computer system or computer network, for carrying out a method according to any of the exemplary embodiments described.

In summary, in the context of the present disclosure, the following exemplary embodiments are provided:

Exemplary embodiment 1: Optical device for determining a distance of a measurement object, comprising:
  a) at least one LIDAR unit, having at least one illumination device configured to generate at least one frequency-modulated input light beam and to illuminate the measurement object with the input light beam, wherein the LIDAR unit has at least one measurement channel configured to detect at least one measurement beam reflected from the measurement object in response to the input light beam and to generate at least one LIDAR measurement signal;
  b) at least one light sensor having at least one optical source with at least one mode-locked laser, wherein the mode-locked laser is configured to generate at least one first frequency comb signal and at least one second frequency comb signal, wherein the light sensor is configured to split the first frequency comb signal into at least one first measurement signal and at least one first reference signal and to illuminate the measurement object with the first measurement signal, wherein the light sensor is configured to split the second frequency comb signal into at least one second measurement signal and at least one second reference signal, wherein the light sensor has at least one measurement detector and at least one reference detector, wherein the measurement detector is configured to detect the first measurement signal reflected from the measurement object and the second measurement signal, wherein the reference detector is configured to detect the first reference signal and the second reference signal; and
  c) at least one evaluation unit configured to determine at least one item of first distance information of the measurement object from the LIDAR measurement signal, wherein the evaluation unit is configured to evaluate the signals respectively detected by the measurement detector and the reference detector and to generate at least one frequency spectrum of the respective signals, wherein the evaluation unit is configured to determine at least one item of second distance information of the measurement object from a comparison of the frequency spectrum detected by the measurement detector and the frequency spectrum detected by the reference detector.

Exemplary embodiment 2: Optical device according to the preceding exemplary embodiment, wherein the optical device is configured such that the first distance information and the second distance information are determined simultaneously.

Exemplary embodiment 3: Optical device according to any one of the preceding exemplary embodiments, wherein the optical device is configured for tracking the measurement object.

Exemplary embodiment 4: Optical device according to any one of the preceding exemplary embodiments, wherein the evaluation unit is configured to determine an item of combined distance information from the first distance information and the second distance information.

Exemplary embodiment 5: Optical device according to the preceding exemplary embodiment, wherein the first distance information is used for a coarse distance and the second distance information is used for a fine determination of the distance.

Exemplary embodiment 6: Optical device according to any one of the two preceding exemplary embodiments, wherein the evaluation unit is configured to determine and compare a measurement accuracy of the first distance information and the second distance information, wherein the evaluation unit is configured to select one of the first distance information and the second distance information as combined distance information depending on the result of the comparison.

Exemplary embodiment 7: Optical device according to any one of the three preceding exemplary embodiments, wherein the evaluation unit is configured to select the first distance information as combined distance information outside an unambiguity range of the mode-locked laser.

Exemplary embodiment 8: Optical device according to any one of the preceding exemplary embodiments, wherein the input light beam and/or the first and second frequency comb signals have/has wavelengths of 1000 nm to 1700 nm.

Exemplary embodiment 9: Optical device according to any one of the preceding exemplary embodiments, wherein the optical source has at least one dual frequency comb source.

Exemplary embodiment 10: Optical device according to any one of the preceding exemplary embodiments, wherein the first frequency comb signal and the second frequency come signal are dissipative Kerr soliton (DKS) frequency comb signals.

Exemplary embodiment 11: Optical device according to any one of the preceding exemplary embodiments, wherein the LIDAR unit is configured to superpose a reference light beam on at least the detected reflected measurement beam and to determine a frequency spectrum of an arising beat signal, wherein the LIDAR unit is configured to determine at least one peak in the frequency spectrum and to determine the first distance information of the measurement object therefrom.

Exemplary embodiment 12: Optical device according to any one of the preceding exemplary embodiments, wherein the LIDAR unit and/or the light sensor are/is implemented on at least one photonic integrated circuit (PIC).

Exemplary embodiment 13: Optical device according to the preceding exemplary embodiment, wherein the light sensor has at least one photonic integrated circuit configured to split the first frequency comb signal into the first measurement signal and the first reference signal and to split the second frequency comb signal into the second measurement signal and the second reference signal, wherein the photonic integrated circuit is configured to guide the first measurement signal to a coupling device of the light sensor in order to illuminate the measurement object with the first measurement signal, wherein the coupling device is configured to couple the first measurement signal reflected from the measurement object into the photonic integrated circuit, wherein the photonic integrated circuit is configured to guide the reflected first measurement signal and the second measurement signal to the measurement detector, and wherein the photonic integrated circuit is configured to guide the first reference signal and the second reference signal to the reference detector.

Exemplary embodiment 14: Optical device according to the preceding exemplary embodiment, wherein the light sensor has at least one photonic multichip, wherein the multichip has at least one element selected from the group consisting of: the optical source, the measurement detector, the reference detector, the photonic integrated circuit and the evaluation unit.

Exemplary embodiment 15: Optical device according to any one of the two preceding exemplary embodiments, wherein the photonic integrated circuit has a plurality of light guides, wherein the photonic integrated circuit has at least one first fiber-based signal splitter configured to split the first frequency comb signal into the first measurement signal and the first reference signal, wherein the photonic integrated circuit has at least one second fiber-based signal splitter configured to split the second frequency comb signal into the second measurement signal and the second reference signal.

Exemplary embodiment 16: Method for determining a distance of a measurement object, wherein at least one optical device according to any one of the preceding exemplary embodiments is used in the method, wherein the method has the following method steps:

i) determining at least one item of first distance information of the measurement object with at least one LIDAR unit, having at least one illumination device, wherein at least one frequency modulated input light beam is generated by the illumination device and the measurement object is illuminated with the input light beam, wherein the LIDAR unit has at least one measurement channel, wherein at least one measurement beam reflected from the measurement object in response to the input light beam is detected by the measurement channel and at least one LIDAR measurement signal is generated, wherein the first distance information of the measurement object is determined from the LIDAR measurement signal by at least one evaluation unit;

ii) determining at least one item of second distance information of the measurement object with at least one light sensor having at least one optical source with at least one mode-locked laser, wherein at least one first frequency comb signal and at least one second frequency comb signal are generated by the mode-locked laser, wherein the first frequency comb signal is split into at least one first measurement signal and at least one first reference signal and the measurement object is illuminated with the first measurement signal, wherein the second frequency comb signal is split into at least one second measurement signal and at least one second reference signal, wherein the light sensor has at least one measurement detector and at least one reference detector, wherein the first measurement signal reflected from the measurement object and the second measurement signal are detected by the measurement detector, wherein the first reference signal and the second reference signal are detected by the reference detector, wherein the signals respectively detected by the measurement detector and the reference detector are evaluated by the evaluation unit and at least one frequency spectrum of the respective signals is generated, wherein at least one item of second distance information of the measurement object is determined from a comparison of the frequency spectrum detected by the measurement detector and the frequency spectrum detected by the reference detector.

Exemplary embodiment 17: Method according to the preceding exemplary embodiment, wherein the method comprises simultaneously determining the first distance information and the second distance information.

Exemplary embodiment 18: Method according to any one of the preceding exemplary embodiments relating to a method, wherein combined distance information is determined from the first distance information and the second distance information.

Exemplary embodiment 19: Method according to the preceding exemplary embodiment, wherein the first distance information is used for a coarse distance and the second distance information is used for a fine determination of the distance.

Exemplary embodiment 20: Method to any one of the two preceding embodiments, wherein a measurement accuracy of the first distance information and of the second distance information is determined and compared, wherein one of the first distance information and the second distance information is selected as combined distance information depending on the result of the comparison.

Exemplary embodiment 21: Method according to any one of the three preceding exemplary embodiments, wherein the first distance information is selected as combined distance information outside an unambiguity range of the mode-locked laser.

Exemplary embodiment 22: Computer program which, when executed on a computer or computer network, carries out the method according to any one of the preceding exemplary embodiments relating to a method, in one of its configurations.

Exemplary embodiment 23: Computer program product comprising a program code stored on a non-transitory computer-readable storage medium for carrying out the method according to any one of the preceding exemplary embodiments relating to a method when the program is executed on a computer or computer network.

BRIEF DESCRIPTION OF THE DRAWINGS

The disclosure will now be described with reference to the drawings wherein.

DESCRIPTION OF EXEMPLARY EMBODIMENTS

Figure 1:
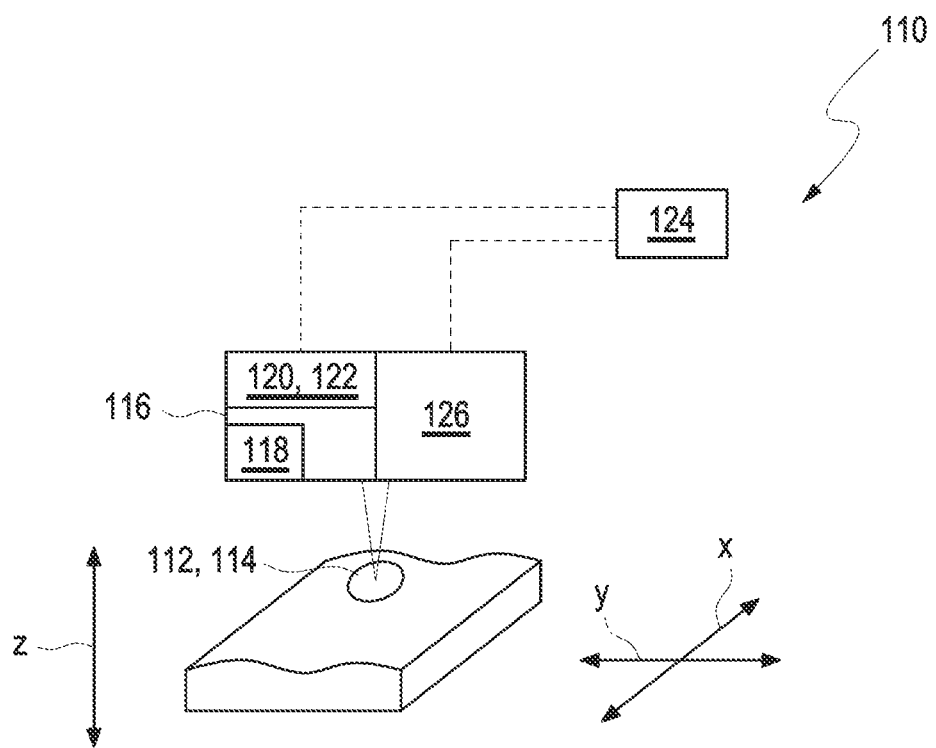
FIG. 1 shows a schematic illustration of an optical device according to an exemplary embodiment of the disclosure.

Further details and features of the disclosure will become apparent from the following description of exemplary embodiments. In this case, the respective features can be realized by themselves or as a plurality in combination with one another. The disclosure is not restricted to the exemplary embodiments. The exemplary embodiments are illustrated schematically in the figures. In this case, identical reference numerals in the individual figures designate identical or functionally identical elements or elements corresponding to one another with regard to their functions.

FIG. 1 shows, highly schematically, one exemplary embodiment of an optical device 110 for determining a distance of a measurement object 112.

By way of example, the measurement object 112 can be a test specimen, a workpiece, a component to be measured, a measuring head of a sensor or a tool that can be used to probe a component. The measurement object 112 can be at least one retroreflector 114 and/or can have at least one retroreflector 114. By way of example, the retroreflector 114 can be a marker. By way of example, the retroreflector 114 can be selected from the group consisting of: a cat's eye, spherical lenses with a reflection layer, a marker as described in US 2011/0007326 A1, US 2013/0050410 A1, or US 2017/0258531 A1, the content of which is hereby incorporated, a cube prism, a corner cube. The retroreflector 114 can be arranged on the measurement object 112 fixedly and/or interchangeably. A position of the retroreflector 114 on the measurement object 112 can be known. The measurement object 112 can have a plurality of retroreflectors 114, for example two, three, four, five, six or more retroreflectors 114.

The optical device 110 can have a hybrid optical sensor system having measurement systems based on different optical measurement methods.

The optical device 110 includes at least one LIDAR unit 116. The LIDAR unit 116 is based on the LIDAR measurement principle, which is also referred to as LIDAR. The LIDAR unit 116 has at least one illumination device 118 configured to generate at least one frequency modulated input light beam, a so-called "frequency modulated continuous wave" (FMCW). The LIDAR unit 116 can be configured to generate the input light beam, the frequency of which is tuned continuously, according to the FMCW method. By way of example, the frequency of the input light beam can be linearly modulated with time. In principle, a combination of LIDAR method and FMCW method is known to a person skilled in the art, for example from Chipscale Lidar, Benham Behroozpur Baghmisheh, Technical Report No. UCB/EECS.2017-4. By way of example, the LIDAR unit 116 can be configured as described in U.S. Pat. No. 9,559,486 B2, U.S. Pat. No. 8,913,636 B2, or US 2016/123718 A1.

The frequency-modulated input light beam can have a modulated, for example linearly modulated, frequency. The illumination device 118 can have at least one FMCW light source. The illumination device 118 can have at least one adjustable (tunable) laser source, for example at least one distributed feedback (DFB) laser diode or a distributed Bragg reflector (DBR) laser diode.

The LIDAR unit 116 has at least one measurement channel 120 configured to capture at least one measurement beam reflected from the measurement object 112 in response to the input light beam and to generate at least one LIDAR measurement signal. The measurement channel 120 can be configured to illuminate the measurement object 112, in particular at least one retroreflector 114, with at least one portion of the input light beam and to capture at least one beam reflected from the measurement object 112.

The measurement channel 120 can have at least one optical fiber, in particular at least one monomode fiber and/or at least one multimode fiber. The measurement channel 120 can have at least one first optical element. The first optical element can be configured to couple the input light beam passing through the optical fiber out of the optical fiber and to couple the light beam reflected from the measurement object 112 into the optical fiber. The optical fiber can have a fiber beginning and a fiber end, wherein at least one portion of the input light beam passes through the optical fiber from fiber beginning to fiber end. The first optical element can be arranged at the fiber end. The optical element can include an output coupling optical unit. The optical element can include an input coupling optical unit. The output coupling optical unit and the input coupling optical unit can be identical.

The measurement channel 120 can have at least one static or adjustable mirror. By way of example, the optical device 110 can have at least one controller, not illustrated in the figures, configured to control the mirror and to set it into any angular position.

The measurement channel 120 can have at least one optical unit configured to expand a light beam into a solid angle, such that the measurement object 112, in particular at least three retroreflectors 114 arranged on the measurement object 112, are irradiated. By way of example, the measurement channel 120 can have a wide-angle lens. The optical unit can have at least one converging lens or a concave lens. Typically, use can be made of a converging lens, which facilitates an approximately tilted plane wavefront at the retroreflector 114 and good efficiency during the input coupling at the focal point.

The LIDAR unit 116, in particular the measurement channel 120, can have at least one sensor element 122 configured to detect the reflected measurement beam. The sensor element 122 can have at least one photodiode.

The LIDAR unit 116 is configured to generate at least one LIDAR measurement signal. The LIDAR unit 116 can be configured to generate a reference light beam. The LIDAR unit 116 can have at least one reference arm. The reference light beam can be a current input light beam which is supplied to the sensor element 122 via the reference arm of the LIDAR unit 116, for example. The sensor element 122 can be configured to superpose the reflected measurement beam on the reference light beam. The LIDAR measurement signal can have at least one item of information about a frequency difference, also referred to as frequency delta, between the reference light beam and reflected measurement beam. The LIDAR measurement signal can be a signal in which the reference light beam is superposed on the reflected measurement beam. The LIDAR measurement signal can be a frequency spectrum of a beat signal of the reference light beam superposed with the reflected measurement beam. The LIDAR unit 116 can be configured to superpose the reference light beam on at least one reflected measurement beam and to determine a frequency spectrum of an arising beat signal.

The optical device 110 has at least one evaluation unit 124. The evaluation unit 124 can be configured to evaluate signals generated by the LIDAR unit. By way of example, one or more electronic connections between the LIDAR unit 116 and the evaluation unit 124 can be provided for this purpose. The evaluation unit 124 can include for example at least one data processing device, for example at least one computer or microcontroller. The data processing device can have one or more volatile and/or non-volatile data memories, wherein the data processing device can be configured for example in terms of programming to control the LIDAR unit 116. The evaluation unit 124 can furthermore include at least one interface, for example an electronic interface and/or a human-machine interface such as, for example, an input/output device such as a display and/or a keyboard. The evaluation unit can be constructed for example centrally or else in a decentralized manner. Other configurations are also conceivable. The evaluation unit 124 can have at least one A/D converter.

The evaluation unit 124 is configured to determine at least one item of first distance information of the measurement object 112 from the LIDAR measurement signal. The distance information can be an item of information about the distance of the measurement object 112, for example a distance value and/or the longitudinal coordinate and/or a change in the distance.

The LIDAR unit 116 can be configured to superpose a reference light beam on at least the captured reflected measurement beam and to determine a frequency spectrum of an arising beat signal. The evaluation unit 124 can be configured to determine the frequency spectrum with a Fourier transformation. The frequency spectrum can have at least one maximum, in particular a plurality of maxima, so-called peaks. The evaluation unit 124 can be configured to identify at least one peak of the frequency spectrum. The LIDAR unit 116 can be configured to determine at least one peak in the frequency spectrum. The first distance information of the measurement object 112 can be determined from the information about the arrangement of the peak in the frequency spectrum.

The evaluation unit 124 can be configured to carry out a calibration method. The evaluation unit 124 can be configured to calibrate a fit function. At least one frequency spectrum can be determined in the calibration method for at least one retroreflector 114 with a known distance. The evaluation unit 124 can be configured to determine at least one peak in the frequency spectrum and to calibrate that with the known distance. In this case, said fit function can be a 1D polynomial, for example, wherein the z-coordinate of the retroreflector 114 is mapped onto the frequency position in the frequency spectrum. The evaluation unit 124 can be configured to calculate the distance of the retroreflector 114 from the information about the peak position in the frequency spectrum.

The optical device 110 includes at least one light sensor 126 in addition to the LIDAR unit 116. The LIDAR unit 116 and the light sensor 126 are measurement systems based on different optical measurement methods. A combination of these two optical measurement systems has numerous advantages and can enable, in particular, an extremely compact and robust realization for distance measurement.

Figure 2:
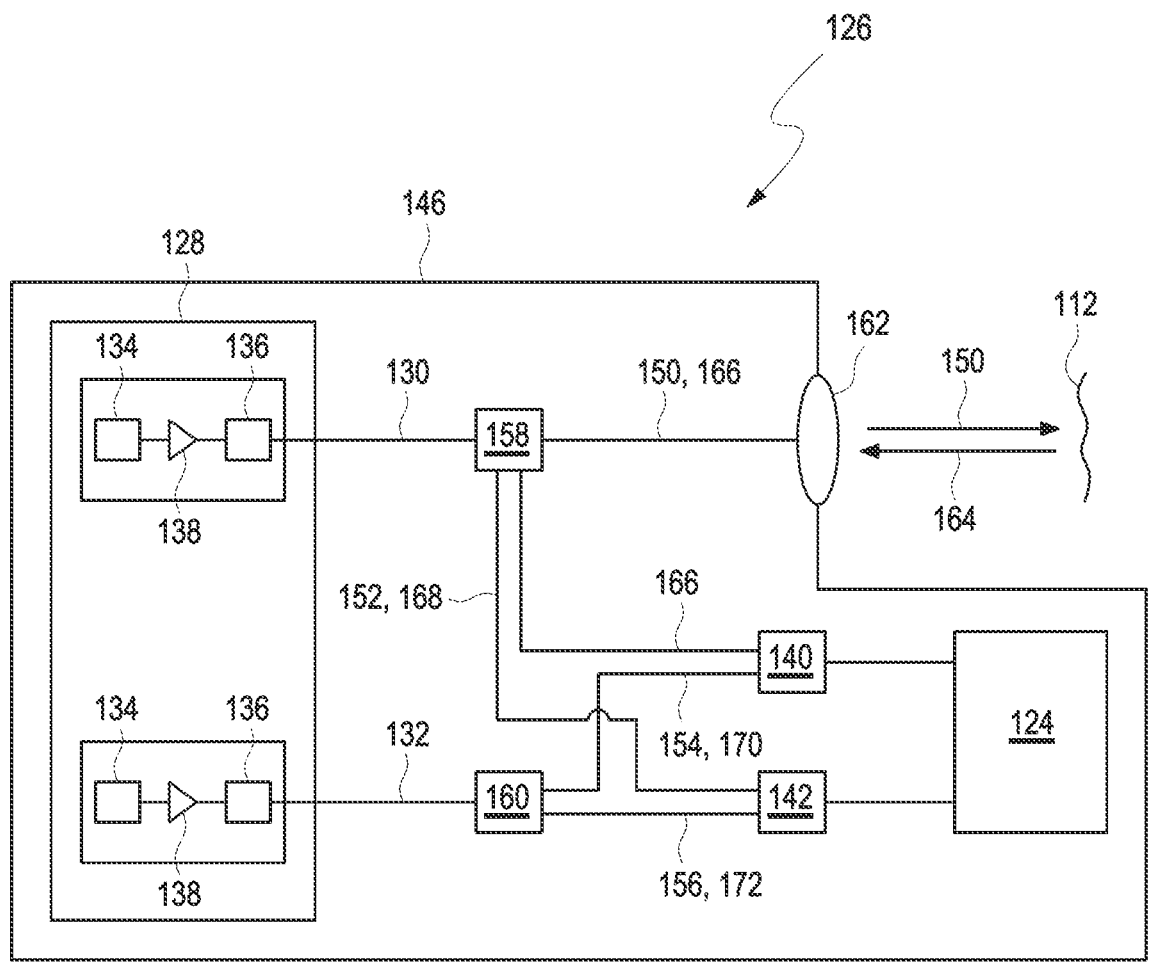
FIG. 2 shows a schematic illustration of a light sensor.

FIG. 2 shows, highly schematically, one exemplary embodiment of the light sensor 126. The light sensor 126 includes at least one optical source 128. The optical source 128 can include at least one dual frequency comb source. The dual frequency comb source can be configured to generate at least two frequency combs. The frequency comb can respectively have a plurality of modes having a substantially constant spacing with respect to one another. By way of example, the frequency spacing of the modes can be strictly constant, with phase fluctuations being possible, in the mode-locked lasers. The optical source 128 is configured to generate at least one first frequency comb signal 130 and at least one second frequency comb signal 132. The first frequency comb signal 130 and the second frequency comb signal 132 can each have a light signal comprising a pulse train. The pulse train can have a plurality of pulse repetitions of the frequency comb. The dual frequency comb source 128 can include two integrated continuous wave (cw) laser sources 134. The first frequency comb signal 130 and the second frequency comb signal 132 can be dissipative Kerr soliton (DKS) frequency comb signals. The dual frequency comb source 128 can include at least two microresonators 136, in particular silicon nitride ($Si_3N_4$) microresonators. The continuous wave (cw) laser sources 134 can be configured to pump the microresonators 136. The microresonators 136 can be configured to generate the DKS frequency comb signals. Furthermore, the dual frequency comb source 128 can include at least one amplifier 138, in particular an erbium doped fiber amplifier.

The first frequency comb signal 130 and the second frequency comb signal 132 can have the same wavelength range or different wavelength ranges. By way of example, the first frequency comb signal 130 and the second frequency comb signal 132 can have frequencies ranging from 150 to 500 THz. By way of example, the first frequency comb signal and the second frequency comb signal can have laser wavelengths around 1300 nm or else around 1100 nm. The first frequency comb signal and the second frequency comb signal can have a spectral overlap, at least in part, such that a beat arises.

The light sensor 126 further includes at least one measurement detector 140 and at least one reference detector 142, each of which are configured to detect at least one input light signal. By way of example, the measurement detector 140 and the reference detector 142 can each have at least one photodetector.

The light sensor 126 can include at least one photonic integrated circuit 144. The photonic integrated circuit 144 can be configured for communication between the components of the circuit 144 with light signals. To this end, the components of the circuit 144 can be disposed on a common substrate 146, for example a chip, more particularly a microchip. The photonic integrated circuit 144 can include a plurality of light guides, in particular fiber-based light guides. By way of example, the light sensor 126 can have at least one photonic multichip. The multichip can include the optical source 128, the measurement detector 140, the reference detector 142, the photonic integrated circuit 144 and the evaluation unit 124. By way of example, the photonic multichip can be configured as described in "Ultrafast optical ranging using microresonator soliton frequency combs", P. Trocha et al., Science, RESEARCH REPORTS, 23 Feb. 2018, volume 359, issue 6378. The photonic integrated circuit 144 facilitates a robust, comparatively inexpensive, and compact integration of frequency comb generators in measuring and processing machines.

The photonic integrated circuit 144 can be configured to split the first frequency comb signal 130 into at least one first measurement signal 150 and at least one first reference signal 152 and to split the second frequency comb signal 132 into at least one second measurement signal 154 and at least one second reference signal 156. The photonic integrated circuit 144 can include at least one first fiber-based signal splitter 158 configured to split the first frequency comb signal 130 into the first measurement signal 150 and the first reference signal 152. The photonic integrated circuit 144 can include at least one second fiber-based signal splitter 160 configured to split the second frequency comb signal 132 into the second measurement signal 154 and the second reference signal 156. The photonic integrated circuit 144 is configured to guide the first measurement signal 150 to a coupling device 162 of the light sensor 110 in order to illuminate the measurement object 112 with the first measurement signal 150. The coupling device 162 is configured to couple the first measurement signal 164 reflected from the measurement object 112 into the photonic integrated circuit 144. The coupling device 162 can include at least one microlens. The microlens can be configured to collimate the first measurement signal 150 to the measurement object 112.

The photonic integrated circuit 144 can be configured to guide the reflected first measurement signal 164 to the measurement detector 140. To this end, provision can be made of one or more light guides configured to guide the first measurement signal 150 from the coupling device 162 to the measurement detector 140. The photonic integrated circuit 144 can be configured to guide the first reference signal 152 to the reference detector 142. To this end, one or more light guides 168 can be provided between the first fiber-based signal splitter 158 and the reference detector 142.

The photonic integrated circuit 144 can be configured to guide the second measurement signal 154 to the measurement detector 140. To this end, one or more light guides 170 can be provided between the second fiber-based signal splitter 160 and the measurement detector 140. The photonic integrated circuit 144 is configured to guide the second reference signal 156 to the reference detector 142. To this end, one or more light guides 172 can be provided between the second fiber-based signal splitter 160 and the reference detector 142.

The measurement detector 140 and the reference detector 142 can be configured to each generate at least one electrical signal in response to the incident light signals. The measurement detector 140 and the reference detector 142 can each have at least one amplifier configured to amplify the electrical signals.

The measurement detector 140 and the reference detector 142 can be configured for a multiheterodyne detection. The measurement detector 140 can be configured to superpose the first measurement signal 150 and the second measurement signal 154. This allows a signal, the second measurement signal 154, with a known spectral intensity profile to be superposed on a signal to be measured, the first measurement signal 150. The first measurement signal 150 and the second measurement signal 154 can have slightly different frequencies so that so-called "beats" are generated in the case of a superposition of the first measurement signal and the second measurement signal. The reference detector 142 can be configured to superpose the first reference signal 152 and the second reference signal 156. The first reference signal 152 and the second reference signal 156 can have slightly different frequencies so that beats are generated in the case of a superposition of the first reference signal and the second reference signal. A coordinate of the measurement object 112, in particular a distance therefrom, can be determined from a comparison of the beat spectra detected by the measurement detector 140 and the reference detector 142.

The evaluation unit 124 can be configured in terms of programming to control the optical source 128 and/or the measurement detector 140 and/or the reference detector 142. The evaluation unit 124 is configured to evaluate the input light signals respectively detected by the measurement detector 140 and the reference detector 142 and to generate at least one frequency spectrum of the respective input signals. At least one coordinate of the measurement object 112, in particular a distance between light sensor 126 and measurement object 112, is determinable from a comparison of the frequency spectrum detected by the measurement detector 140 with the frequency spectrum detected by the reference detector 142. By changing the alignment of the light sensor 126 along at least one further axis, it is possible to determine further coordinates of the measurement object 112 in the manner described. The evaluation unit 124 can include at least one analogue-to-digital converter (ADC) configured to receive the electrical signals generated by the measurement detector 140 and the reference detector 142. The evaluation unit 124 can include at least one field programmable gate array (FPGA) configured to evaluate the signals received by the ADC.

The optical device 110 can be configured for tracking the measurement object 112. In particular, the optical device 110 can be configured to track a movement of the measurement object 112.

The optical device 110 can be configured such that the first distance information and the second distance information are determined simultaneously. The optical device 110 can enable a distance measurement in which a measurement of a distance and/or of a change in the distance is effected simultaneously with a LIDAR unit 116 and a light sensor 126 with a mode-locked laser. For the LIDAR unit 116 it is possible to give up a high tracking bandwidth as a requirement. The absolute distance measurement can be effected only at a speed sufficient to ensure that a situation where a distance measurement with the light sensor 126 crosses the limit of the ambiguity range is detected unambiguously and certainly. This can increase the measurement accuracy. The measurement with the LIDAR unit 116 can yield a low-frequency, highly accurate absolute distance measurement. Light sensors 126 using a mode-locked laser can have a limited unambiguity range within which displacements can be measured unambiguously. For the light sensor 126 it is possible to give up the requirement for a large unambiguity range, which makes it possible to increase the sampling rate. The light sensor 126 can, using a mode-locked laser, for example a femtosecond laser, yield a high-frequency, highly accurate distance measurement within the unambiguity range of the laser. The hybrid sensor system, that is to say the combination of the LIDAR unit 116 and the light sensor 126, can make it possible to improve and/or increase a performance with regard to sampling rate, measurement range, resolution and accuracy in comparison with optical systems employing single sensor technology.

The evaluation unit 124 can be configured to determine an item of combined distance information from the first distance information and the second distance information. The LIDAR unit 116 can determine distances accurately to 100 micrometers at 10 Hz, for example. The distance measuring system with at least a mode-locked laser yields distances accurate to 1 micrometer modulo unambiguity range at 10 kHz, for example. Typically, the unambiguity range should be larger than the accuracy of the LIDAR unit 116. The first distance information is used for a coarse distance and the second distance information is used for a fine determination of the distance. The first distance information is used for a coarse distance and the second distance information is used for a fine determination of the distance. The distance information of the LIDAR unit 116 can be used for the coarse distance and a distance information of the mode-locked laser can be used for the decimal places. By way of example, the evaluation unit 124 can be configured to determine and compare a measurement accuracy of the first distance information and of the second distance information. The evaluation unit 124 can be configured to select one of the first distance information and the second distance information as combined distance information, depending on the result of the comparison. The evaluation unit 124 can be configured to select the first distance information as combined distance information outside an unambiguity range of the mode-locked laser. Determining combined distance information can make it possible to improve and/or increase a performance with regard to sampling rate, measurement range, resolution and accuracy in comparison with optical systems with single sensor technology.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

110 Optical device
112 Measurement object
114 Retroreflector
116 LIDAR unit
118 Illumination device
120 Measurement channel
122 Sensor element
124 Evaluation unit
126 Light sensor
128 Optical source
130 1st frequency comb signal
132 2nd frequency comb signal
134 CW laser source
136 Microresonators
138 Amplifier
140 Measurement detector
142 Reference detector
144 Photonic integrated circuit
146 Substrate, photonic multichip

What is claimed is:
1. An optical device for determining a distance of a measurement object, the optical device comprising:
at least one LIDAR unit, having at least one illumination device configured to generate at least one frequency-modulated input light beam and to illuminate the measurement object with the at least one frequency-modulated input light beam, wherein the at least one LIDAR unit has at least one measurement channel configured to detect at least one measurement beam reflected from the measurement object in response to the at least one frequency-modulated input light beam and to generate at least one LIDAR measurement signal;
at least one light sensor having at least one optical source with at least one mode-locked laser, wherein the at least one mode-locked laser is configured to generate at least one first frequency comb signal and at least one second frequency comb signal, wherein the at least one light sensor is configured to split the at least one first frequency comb signal into at least one first measurement signal and at least one first reference signal and to illuminate the measurement object with the at least one first measurement signal, wherein the at least one light sensor is configured to split the at least one second frequency comb signal into at least one second measurement signal and at least one second reference signal, wherein the at least one light sensor has at least one measurement detector and at least one reference detector, wherein the at least one measurement detector is configured to detect the at least one first measurement signal reflected from the measurement object and the at least one second measurement signal, wherein the at least one reference detector is configured to detect the at least one first reference signal and the at least one second reference signal; and
at least one evaluation unit configured to determine at least one item of first distance information of the measurement object from the at least one LIDAR measurement signal, wherein the at least one evaluation unit is configured to evaluate signals respectively detected by the at least one measurement detector and the at least one reference detector and to generate at least one frequency spectrum of the respective signals, and wherein the at least one evaluation unit is configured to determine at least one item of second distance information of the measurement object from a comparison of the at least one frequency spectrum detected by the at least one measurement detector and the at least one frequency spectrum detected by the at least one reference detector.

2. The optical device according to claim 1, wherein the optical device is configured such that the first distance information and the second distance information are determined simultaneously.

3. The optical device according to claim 1, wherein the at least one evaluation unit is configured to determine an item of combined distance information from the first distance information and the second distance information.

4. The optical device according to claim 1, wherein a coarse distance is determined based on the first distance information, and
wherein a fine determination of the distance is performed based on the second distance information.

5. The optical device according to claim 1, wherein the at least one optical source has at least one dual frequency comb source.

6. The optical device according to claim 1, wherein the at least one LIDAR unit is configured to superpose a reference light beam on at least the detected reflected measurement beam and to determine a frequency spectrum of an arising beat signal, and
wherein the at least one LIDAR unit is configured to determine at least one peak in the frequency spectrum and to determine the first distance information of the measurement object therefrom.

7. The optical device according to claim 1, wherein the at least one LIDAR unit and/or the at least one light sensor are/is implemented on at least one photonic integrated circuit.

8. A method for determining the distance of the measurement object with at least one optical device according to claim 1, the method comprising:
determining the at least one item of first distance information of the measurement object with the at least one LIDAR unit, having the at least one illumination device, wherein the at least one frequency-modulated input light beam is generated by the at least one illumination device and the measurement object is illuminated with the at least one frequency-modulated input light beam, wherein the at least one LIDAR unit has the at least one measurement channel, wherein the at least one measurement beam reflected from the measurement object in response to the at least one frequency-modulated input light beam is detected by the at least one measurement channel and the at least one LIDAR measurement signal is generated, wherein the at least one item of first distance information of the measurement object is determined from the at least one LIDAR measurement signal by the at least one evaluation unit; and determining the at least one item of second distance information of the measurement object with the at least one light sensor having the at least one optical source with the at least one mode-locked laser, wherein the at least one first frequency comb signal and the at least one second frequency comb signal are generated by the at least one mode-locked laser, wherein the at least one first frequency comb signal is split into the at least one first measurement signal and the at least one first reference signal and the measurement object is illuminated with the at least one first measurement signal, wherein the at least one second frequency comb signal is split into the at least one second measurement signal and the at least one second reference signal, wherein the at least one light sensor has the at least one measurement detector and the at least one reference detector, wherein the at least one first measurement signal reflected from the measurement object and the at least one second measurement signal are detected by the at least one measurement detector, wherein the at least one first reference signal and the at least one second reference signal are detected by the at least one reference detector, wherein the signals respectively detected by the at least one measurement detector and the at least one reference detector are evaluated by the at least one evaluation unit and the at least one frequency spectrum of the respective signals is generated, and wherein the at least one item of second distance information of the measurement object is determined from the comparison of the at least one frequency spectrum detected by the at least one measurement detector and the at least one frequency spectrum detected by the at least one reference detector.

9. A computer program which, when executed on a computer or computer network, carries out the method according to claim 8.

10. A non-transitory computer-readable storage medium encoded with a computer program product comprising a program code that when executed on a computer or computer network causes the computer or computer network to carry out the method according to claim 8.

* * * * *